Figure 3:
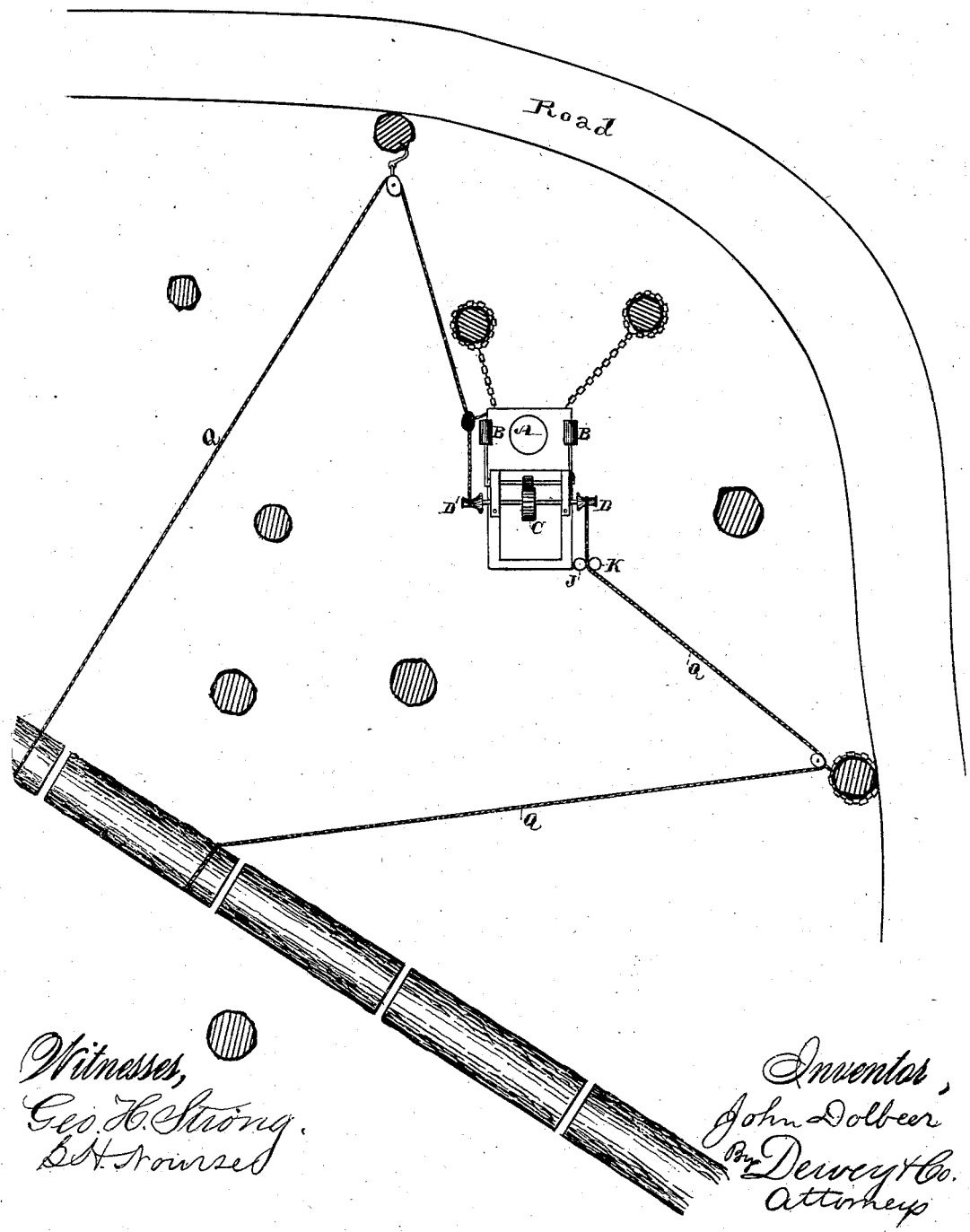

(No Model.)  2 Sheets—Sheet 1.
J. DOLBEER.
LOGGING ENGINE.
No. 256,553.  Patented Apr. 18, 1882.
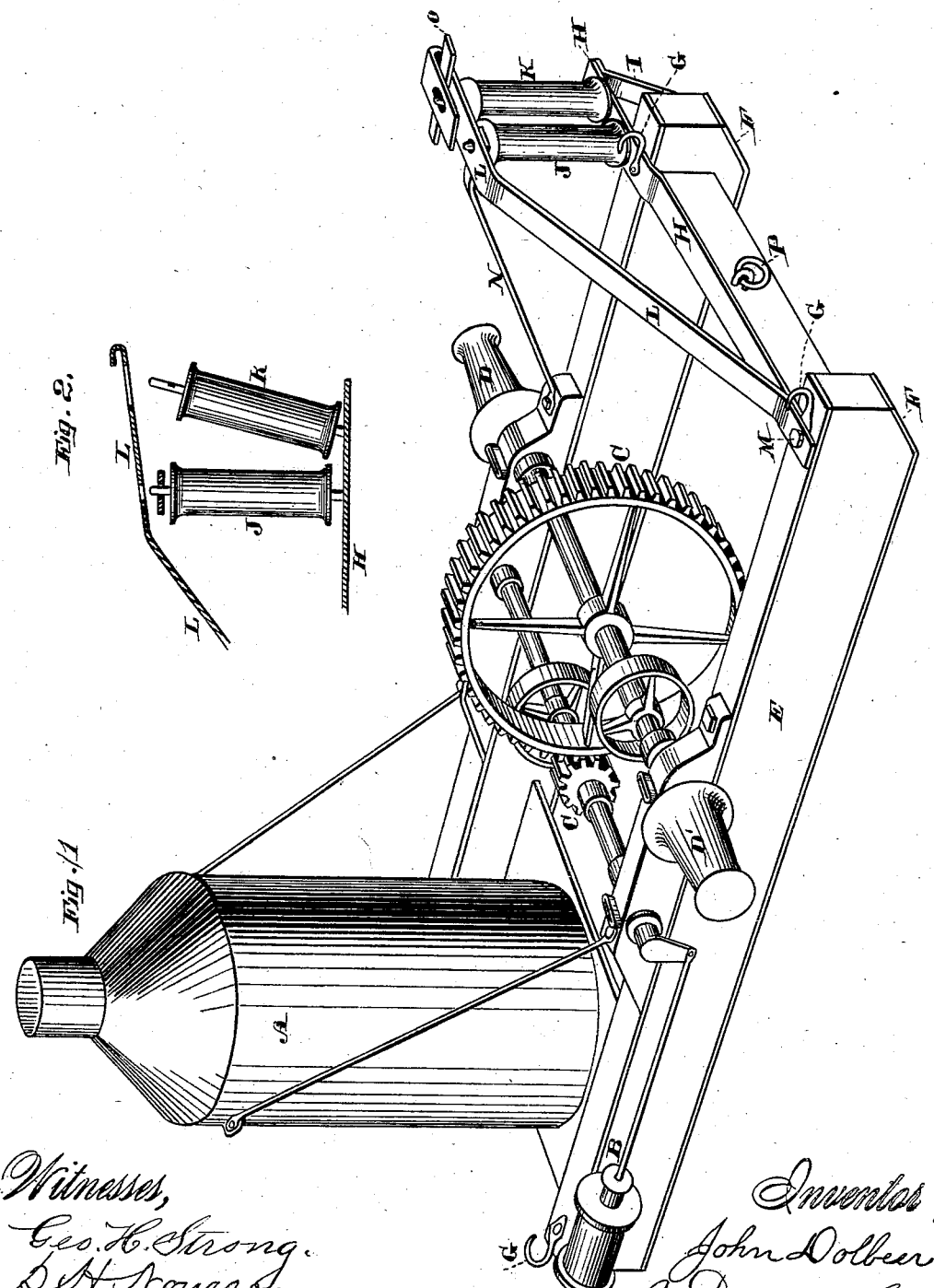
Witnesses,
Geo. H. Strong.
S. H. Strouse
Inventor,
John Dolbeer
By Dewey & Co.
Attorneys (No Model.) 2 Sheets—Sheet 2.

J. DOLBEER.
LOGGING ENGINE.

No. 256,553. Patented Apr. 18, 1882.

UNITED STATES PATENT OFFICE.

JOHN DOLBEER, OF SAN FRANCISCO, CALIFORNIA.

LOGGING-ENGINE.

SPECIFICATION forming part of Letters Patent No. 256,553, dated April 18, 1882.

Application filed February 28, 1882. (No model.)

*To all whom it may concern:*

Be it known that I, JOHN DOLBEER, of San Francisco, county of San Francisco, State of California, have invented an Improved Logging-Engine; and I do hereby declare the following to be a full, clear, and exact description thereof.

My invention relates to an apparatus for use in moving heavy logs after trees have been felled and cut up; and it consists of an ordinary hoisting-engine, gear, and frame, in combination with certain appliances by which the engine may be made to move logs to any desired point near the engine, as will be more fully explained by reference to the accompanying drawings, in which—

Figure 1 is a view of the apparatus. Fig. 2 is a view of the guide-rollers separated to admit a rope. Fig. 3 is a general plan of the apparatus and operative ropes.

In the business which is technically known as "logging," after trees have been felled and cut into suitable lengths the logs often lie in inconvenient and inaccessible places, and, as many of the redwood logs which are cut upon the Pacific coast run from four to twelve feet in diameter, they are very unwieldy to handle. In order to bring them to a point where they can be loaded for transportation or brought to the mill, it is necessary to employ large teams of horses or oxen.

My invention is designed to provide a convenient apparatus, which is mounted upon a sled-like frame, and is provided with appliances for the guidance of ropes and tackle, by which the engine may move itself to any desired position, where it may be secured by suitable chains, by which it is anchored to stumps or trees. By means of attachments and guides the tackle may be made to work at any angle and in any direction from the apparatus, so as to move a log to any desired point.

A is the boiler, B the engine, C the gearing, and D D' the gripping-heads, of an apparatus, which may be made of any desired patterns; but I have shown in the present case an upright boiler and horizontal engine, such as are used for hoisting purposes. This machine is mounted upon a strong frame, E, the side timbers of which may be beveled off or curved at the lower front end, F, and shod with wood or iron like a sled, so that it may be hauled from one point to another, and at the same time have a firm and rigid base when set at any point where its work is to be done. At each end of this frame strong hooks or eye-bolts G are fixed upon the top, and these serve for the attachment of ropes or chains which lead to trees or stumps, so that the apparatus may be securely anchored and steadied while at work.

Across the front end of the frame a strong iron bar, H, extends, projecting from one side and supported by a brace, I, as shown. This projecting portion serves to support the vertical rollers, J K, which stand in a line with the gypsy D. The flanges at each end of these rollers are near enough together to prevent the rope from being pulled out, and these rollers act as guides, so that the rope will pass in a straight line to the winding-gypsy whatever may be the angle at which it arrives at the guide-rollers. The upper journals of these rollers pass through holes in a strong bar, L, which is horizontal where it extends above the rollers, but is bent at an angle so as to meet the frame E at the opposite corner, where a bolt, M, secures it firmly, but with sufficient play to allow the opposite end to be lifted from the journals of the rollers.

A brace, N, holds the rollers J in place and makes the whole stiff and rigid when ready for use. When the arm L is lifted off the journals the outer roller, K, is allowed to tip outward at an angle, as shown in Fig. 2, and this enables the operator to introduce or remove the rope at will, after which the roller and the brace L are replaced. A bar or key, O, serves to lock or secure the roller-shaft in place.

The operation will then be as follows: The machine is placed at any desired point by attaching a rope or chain to the ring P or hook G and leading it to a snatch-block, which is anchored at some desired point. From this block the rope is carried back between the guide-rollers J K and to the gypsy D. The engine then being set in motion will haul upon the rope, which may have three or more turns around the gypsy, and will thus place itself at any required point. When thus placed it is securely anchored, as before described, and the rope, cable, or chain is secured to the log which is to be moved. Sheaves or snatch-blocks are strongly anchored in a line with the direction in which the log is to be moved, and the chain or cable passed through them and thence to the gypsy D of the apparatus. By this means all the logs within a considerable distance from the machine may be hauled in any direction and to any point without moving the machine from its station, and may be loaded upon the trucks or wagons by its assistance.

It will be seen that the snatch-blocks may be secured to the apparatus in place of the guide-rollers J K and at either corner, so that the work may be done from either gypsy and from any direction from the apparatus, as shown in Fig. 3.

Having thus described my invention, what I claim as new, and desire to secure by Letters Patent, is—

1. The means herein described for moving logs, consisting of the ropes or chains Q, secured to the log, passing thence to the anchored snatch-blocks, in combination with a gypsy having the vertical guide-rollers J K, or an equivalent guiding device, substantially as and for the purpose herein shown.

2. In combination with an engine and apparatus having a gypsy, as shown, the supporting frame-work having the longitudinal bearing-timbers E, beveled or curved at the front and shod so as to form runners upon which the machine may be moved from place to place.

3. In combination with an engine, gearing, and gypsy D, as shown, the vertical flanged guide-rollers K L, having a space between them in a line with the gypsy, or an equivalent fixed guiding device, substantially as and for the purpose herein described.

4. The vertical flanged guide-rollers J K, having their lower ends journaled in the support H, the roller K being made to tilt outward at an angle, as shown, in combination with the top journal-support, L, made movable about the point M, and a locking bar or plate, substantially as described.

5. The steam-operated gypsy D, mounted upon the longitudinal supporting-runners E, beveled or curved in front and having the point of attachment P or G for a rope, in combination with the rollers J K, or equivalent guide, and the rope Q, leading from the apparatus to an anchored snatch-block, and thence between the guide-rollers to the gypsy, substantially as and for the purpose herein described.

6. The means herein described for moving logs, consisting of the rope or chain Q, secured to the log and leading through an anchored block, by which the direction of the log is fixed, and thence through guides J K upon the engine-frame to the steam-driven gypsy D, substantially as herein described.

In witness whereof I hereby set my hand.

JOHN DOLBEER.

Witnesses:
S. H. NOURSE,
G. W. EMERSON.